Patented June 16, 1931

1,810,658

UNITED STATES PATENT OFFICE

WOLF KRITCHEVSKY, OF CHICAGO, ILLINOIS, ASSIGNOR TO RIT PRODUCTS CORPORATION, OF CHICAGO, ILLINOIS, A CORPORATION OF DELAWARE

DECOLORIZING SUBSTANCE

No Drawing. Application filed December 7, 1928. Serial No. 324,581.

My invention relates to decolorizing or stripping compounds and particularly to an improvement on the composition disclosed in U. S. Patent No. 1,524,737 of February 3, 1925.

In the United States patent above identified there is disclosed a composition of matter consisting of a dry mixture of sulphoxylate-formaldehyde salt and a solid having an acid reaction. This composition is effective as a stripper when in solution with water and boiled with the material to be stripped.

However, I have found that when there is added to this compound a salt of sulphonic acid of alkylated polynuclear hydrocarbon the efficiency of the product is greatly increased due to better penetration.

I have also found that not only does this particular compound improve the stripping and penetrating action of the mixture, which I have described, but that it will greatly increase the efficiency of a mixture of an acid reacting compound and the plain hydro-sulphite; this also applies to a mixture of zinc dust or any other reducing metal and sodium bisulphite. In general, my idea is to produce a composition of matter consisting of a chemical of the constitution described, having a high wetting power, and a chemical or mixture of chemicals of the hydrosulfite class that will act as reducing agents.

As illustrations of effective compounds, a few examples are given:

1. 8 oz. of sulphoxylate formaldehyde of zinc, 8 oz. of sodium bisulphite, ½ oz. of iso-propyl-naphthalene sodium sulphonate.

2. 10 oz. of sodium hydrosulphite, 20 oz. of sodium sulphite, 1 oz. of iso-propyl naphthalene sulphonic acid.

3. 5 oz. of sulphoxylate-formaldehyde of zinc or some other metal, 10 oz. of aluminum sulphate, 1 oz. of butyl naphthalene sodium sulphonate.

4. 1 oz. zinc dust, 4 oz. sodium bisulphite, ¼ oz. of iso-anyl-naphthalene sodium sulphonate.

Of the products specified in the examples, some are soluble in water, while others are not. Those that are water soluble go into reaction immediately upon solution in water, while those that are not water soluble develop their hydrogen gradually upon heating.

The proportions mentioned in the examples may be varied with wide limits and the chemicals mentioned therein may be substituted by their equivalents.

I claim:

1. A composition of matter for stripping of color comprising a sulphonic acid salt of an alkylated polynuclear hydrocarbon, having a high wetting power, and a chemical of the hydrosulfite class that will act as a reducing agent.

2. A composition of matter for stripping of color comprising a salt of sulphonated alkylated naphthalene and a chemical of the hydrosulfite class that will act as a reducing agent.

3. A dye stripping agent comprising sodium hydrosulphite and iso-propyl naphthalene sodium sulphonate.

4. A composition of matter comprising sodium sulphoxylate formaldehyde and iso-propyl naphthalene sulphonic acid.

5. A color stripping agent comprising sodium salt of iso-propylnaphthalene sulphonic acid, basic zinc sulphoxylate formaldehyde, and a solid having an acid reaction.

6. The process of stripping fabrics which consists in treating the fabric in an aqueous medium to which is added a composition of matter comprising a sulphonic acid salt of an alkylated polynuclear hydrocarbon having great wetting power and a chemical of the hydrosulfite class, and then when the color is stripped removing the garment, washing it free from the chemicals, and drying.

In testimony whereof I have affixed my signature.

WOLF KRITCHEVSKY.